(12) United States Patent
Lu

(10) Patent No.: US 7,586,753 B2
(45) Date of Patent: Sep. 8, 2009

(54) PORTABLE ELECTRONIC DEVICE WITH SINGLE PRINTED CIRCUIT BOARD

(75) Inventor: Chi-Chung Lu, Tu-Cheng (TW)

(73) Assignee: Chi Mei Communication Systems, Inc., Tu-Cheng, Taipei County (TW)

( * ) Notice: Subject to any disclaimer, the term of this patent is extended or adjusted under 35 U.S.C. 154(b) by 0 days.

(21) Appl. No.: 11/957,330

(22) Filed: Dec. 14, 2007

(65) Prior Publication Data

US 2008/0304216 A1 Dec. 11, 2008

(30) Foreign Application Priority Data

Jun. 8, 2007 (CN) .......................... 2007 1 0074781

(51) Int. Cl.
*H05K 7/02* (2006.01)

(52) U.S. Cl. .................... 361/752; 361/728; 361/730; 361/736; 174/520; 455/90.3

(58) Field of Classification Search ................ 361/752, 361/728, 730, 736; 174/520; 455/90.3, 575.1
See application file for complete search history.

(56) References Cited

U.S. PATENT DOCUMENTS

| | | | | | |
|---|---|---|---|---|---|
| 4,209,735 | A | * | 6/1980 | Yoshida | .................... 320/101 |
| 4,567,354 | A | * | 1/1986 | Sekine | .................... 235/145 R |
| 4,683,519 | A | * | 7/1987 | Murakami | ............. 361/679.08 |
| 4,711,992 | A | * | 12/1987 | Sekine | .................... 235/145 R |
| 4,810,860 | A | * | 3/1989 | Sekine | .................... 235/145 R |
| 4,847,798 | A | * | 7/1989 | Kurashima | ............. 361/679.09 |
| 4,876,441 | A | * | 10/1989 | Hara et al. | .................... 235/488 |
| 6,307,751 | B1 | * | 10/2001 | Bodony et al. | ............. 361/749 |
| 6,462,780 | B1 | * | 10/2002 | Stephany et al. | ............. 348/372 |
| 6,625,030 | B1 | * | 9/2003 | Haixiong | .................... 361/737 |
| 6,986,965 | B2 | * | 1/2006 | Jenson et al. | ................ 429/162 |
| 2006/0227523 | A1 | * | 10/2006 | Pennaz et al. | ............... 361/783 |

\* cited by examiner

*Primary Examiner*—Dean A. Reichard
*Assistant Examiner*—Dameon E Levi
(74) *Attorney, Agent, or Firm*—Steven M. Reiss

(57) ABSTRACT

A portable electronic device (100) includes an upper housing (40), a circuit board (10), a display (12), a battery (14), and a lower housing (20). The upper housing defines a display section (424) therein. The circuit board has a top surface (11) and a bottom surface (13) at an opposite side of the top surface. The display is seen outwardly through the display section. The battery and the display are formed adjacent to each other on the top surface of the circuit board. The circuit board, the battery and the display are placed in-between the lower housing and the upper housing. The upper housing is detachably mounted to the lower housing for detachably holding the battery.

10 Claims, 11 Drawing Sheets

PORTABLE ELECTRONIC DEVICE WITH SINGLE PRINTED CIRCUIT BOARD

BACKGROUND OF THE INVENTION

1. Field of the Invention

The present invention generally relates to portable electronic devices, particularly to a portable electronic device configured (i.e., structured and arranged) with a single printed circuit board.

2. Discussion of the Related Art

With the development of recent technology of information processing, portable electronic devices such as digital cameras, MP3 players, video cameras, mobile phone, and personal digital assistants (PDAs) are widely used. The developing trend of these portable electronic devices is to be light, thin, and small in volume.

A typical portable electronic device includes an upper shell, a keypad, a display, a battery, a circuit board, and a lower shell. The keypad and the display are formed adjacent to each other at one side of the circuit board. The battery is provided at the other side of the circuit board. However, such a portable electronic device has a relative large volume.

Therefore, a new portable electronic device is desired in order to overcome the above-described shortcoming.

SUMMARY

In one embodiment thereof, a portable electronic device includes an upper housing, a circuit board, a display, a battery, and a lower housing. The upper housing defines a display section therein. The circuit board has a top surface and a bottom surface at an opposite side of the top surface. The display is seen through the display section. The battery and the display are formed adjacent to each other on the top surface of the circuit board. The circuit board, the battery and the display are located in-between the lower housing and the upper housing. The upper housing is detachably attached to the lower housing for detachably holding the battery therein.

Other advantages and novel features of the embodiments will become more apparent from the following detailed description thereof when taken in conjunction with the accompanying drawings.

BRIEF DESCRIPTION OF THE DRAWINGS

Many aspects of the present portable electronic device can be better understood with reference to the following drawings. The components in the drawings are not necessarily to scale, the emphasis instead being placed upon clearly illustrating the principles of the present portable electronic device. Moreover, in the drawings, like reference numerals designate corresponding parts throughout the several views, in which:

FIG. 1 is an assembled, isometric view of a portable electronic device, in accordance with a present embodiment;

FIG. 2 is an exploded, isometric view of the portable electronic device shown in FIG. 1;

FIG. 3 is an enlarged, isometric view of a lower housing of the portable electronic device shown in FIG. 2, viewed from another aspect;

FIG. 4 is an enlarged, isometric view of a circuit board of the portable electronic device shown in FIG. 2, viewed from another aspect;

FIG. 5 is an enlarged, isometric view of a card connector and the circuit board of the portable electronic device shown in FIG. 2;

FIG. 6 is an enlarged, isometric view of a frame, a battery and a protecting film of the portable electronic device shown in FIG. 2;

FIG. 7 is an assembled, isometric view of the frame, the battery, the protecting film, and the lower housing of the portable electronic device shown in FIG. 2;

FIG. 8 is an enlarged, isometric view of an upper housing of the portable electronic device shown in FIG. 2;

FIG. 9 is similar to FIG. 8, but viewed from another aspect;

FIG. 10 is an assembled, isometric view of the display, the card connector, the circuit board, and the lower housing of the portable electronic device shown in FIG. 2; and FIG. 11 is an assembled, isometric view of the portable electronic device shown in FIG. 2, viewed from another aspect.

DETAILED DESCRIPTION OF THE EMBODIMENT

The present portable electronic device can be digital cameras, MP3 players, video cameras, mobile phones, PDAs, and the like.

Referring to the drawings in detail, FIGS. 1-2 show a portable electronic device 100 according to a present embodiment. The portable electronic device 100 includes a lower housing 20, an electronic module 50, a frame 30, a protecting film 32, and an upper housing 40. The electronic module 50 and the frame 30 are placed in-between the lower housing 20 and the upper housing 40.

Also referring to FIG. 3, the lower housing 20 includes a main body (not labeled) with an inner surface 21, two lengthways walls 22, and two breadthwise walls 23. The lengthways walls 22 and the breadthwise walls 23 each respectively extend vertically from a corresponding edge of the inner surface 21. One of the two breadthwise walls 23 defines a groove 232 in a center thereof. A protrusion 234 is formed on the bottom surface of the groove 232. A connector 24 is fixed to the breadthwise wall 23. Specifically, the connector 24 includes an inner end 242 positioned on the inner surface 21 and extending towards the other breadthwise wall 23 and includes an outer end 244 extending into the groove 232. One of the two lengthways walls 22 defines a port 224 therein. Four mounting holes 26 are respectively formed on the inner surface 21, substantially at four corners thereof.

Also referring to FIG. 4, the electronic module 50 includes a circuit board 10, a display 12 mounted on the circuit board 10, a battery 14, and a card connector 16. The circuit board 10 is a printed circuit board (PCB) having a top surface 101 and a bottom surface 103 at an opposite side of the top surface 101. The circuit board 10 defines a cutout 104 near one corner thereof and has a charging contact unit 105 formed thereon. Four mounting holes 106 are respectively formed at four corners of the circuit board 10. Each mounting hole 106 corresponds to a mounting hole 26 of the lower housing 20. A plurality of electronic components is attached on the bottom surface 103.

The battery 14 (FIG. 2) has a charging end 142 formed at one side thereof and configured for engaging with the charging contact unit 105. The battery 14 and the display 12 are configured (i.e., structured and arranged) to be adjacent to each other on the top surface 101 of the circuit board 10.

Also referring to FIG. 5, the card connector 16 includes an electronic portion 162 and a substantially U-shaped latching portion 164. The electronic portion 162 is configured for being received in the cutout 104 of the circuit board 10 and for connecting with a surface contact card such as a subscriber identity module (SIM) card. The latching portion 164 extends from one end of the electronic portion 162 and is configured for being attached at one end of the circuit board 10.

Figure 1:
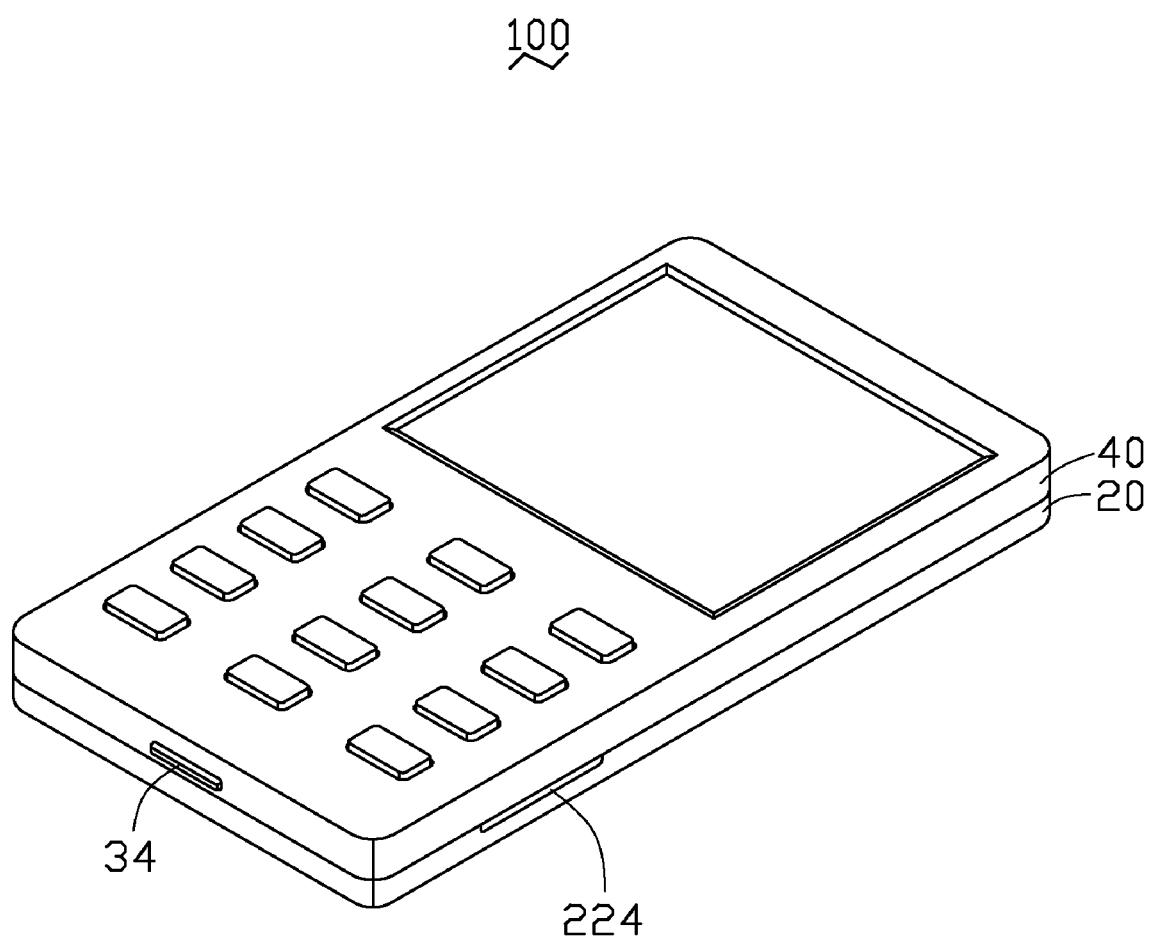
Figure 2:
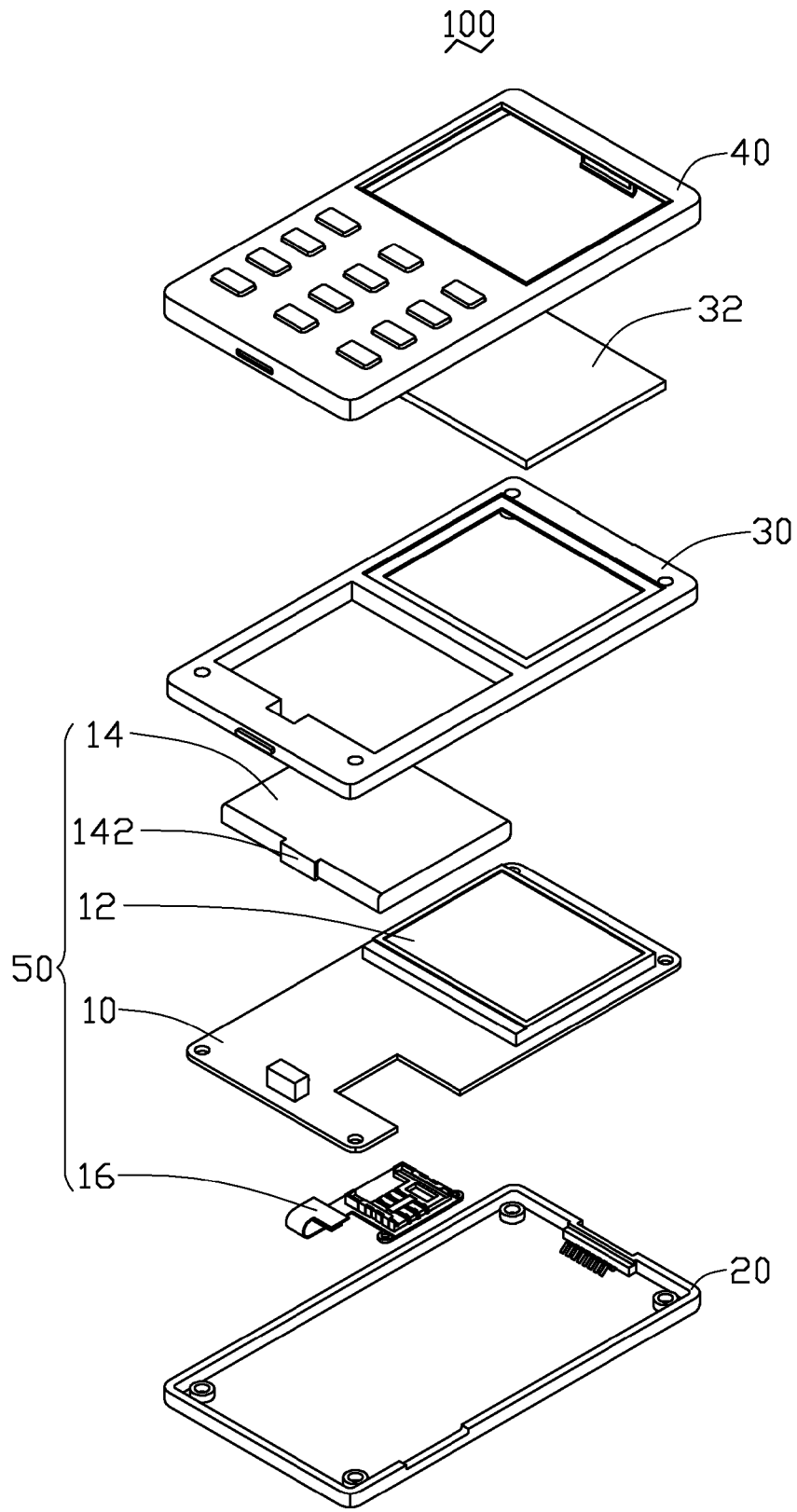
Figure 3:
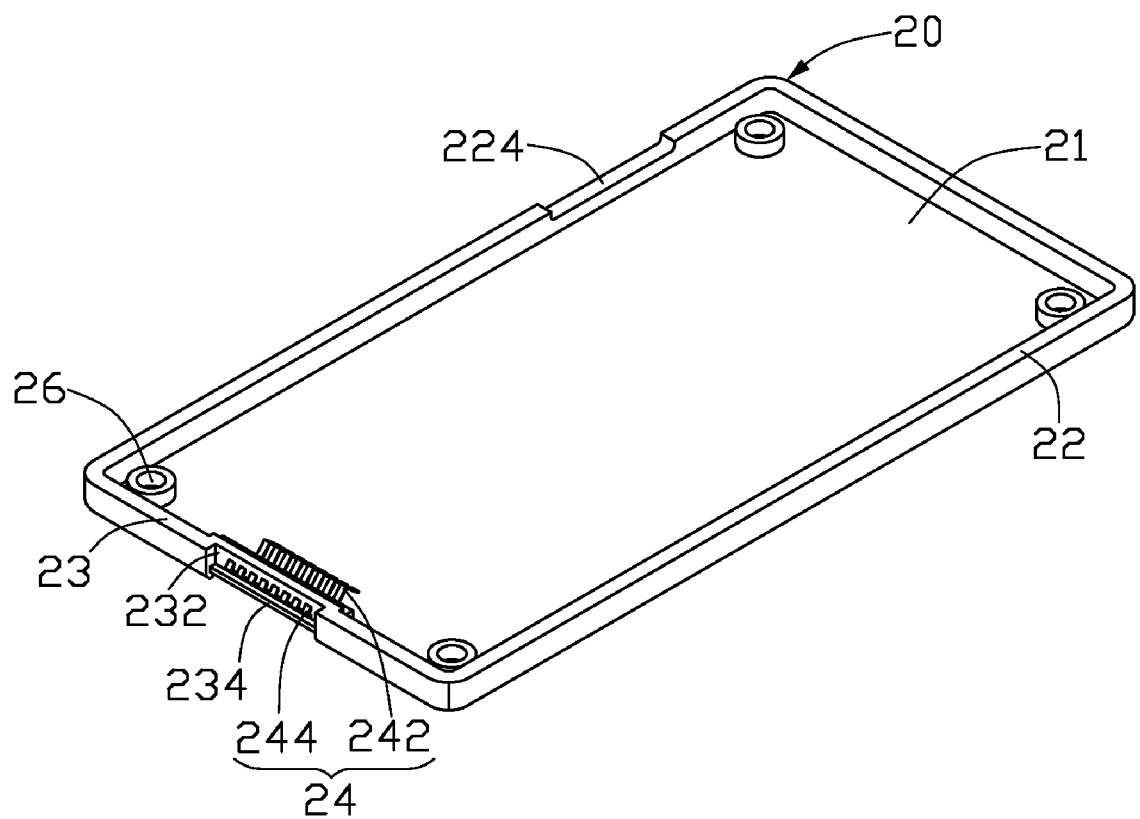
Figure 4:
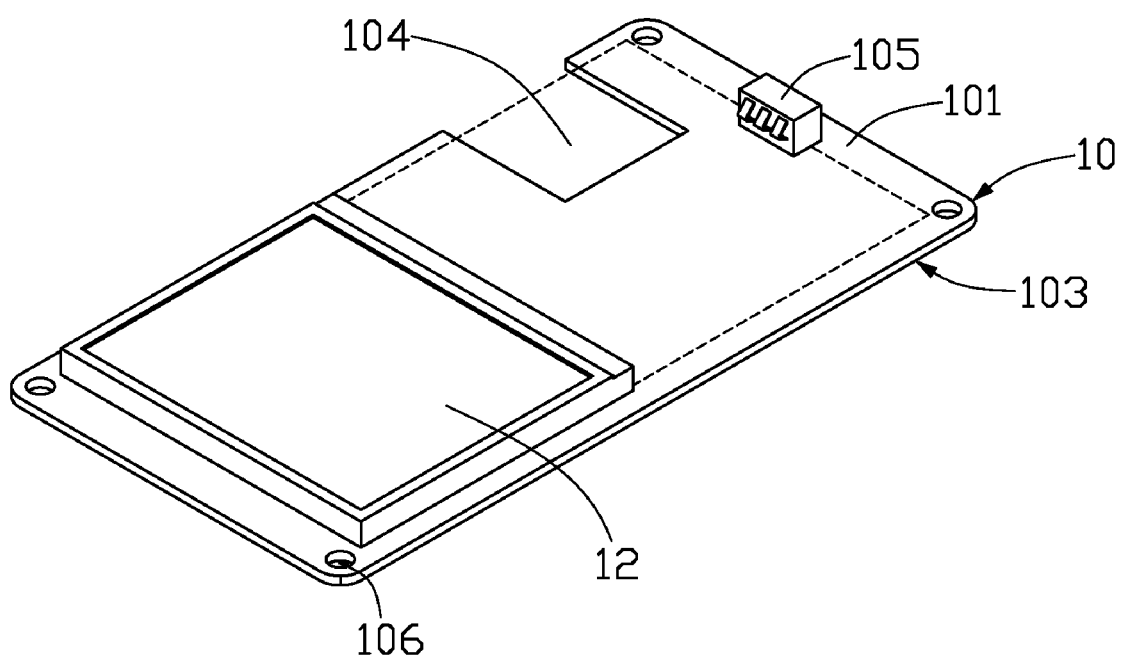
Figure 5:
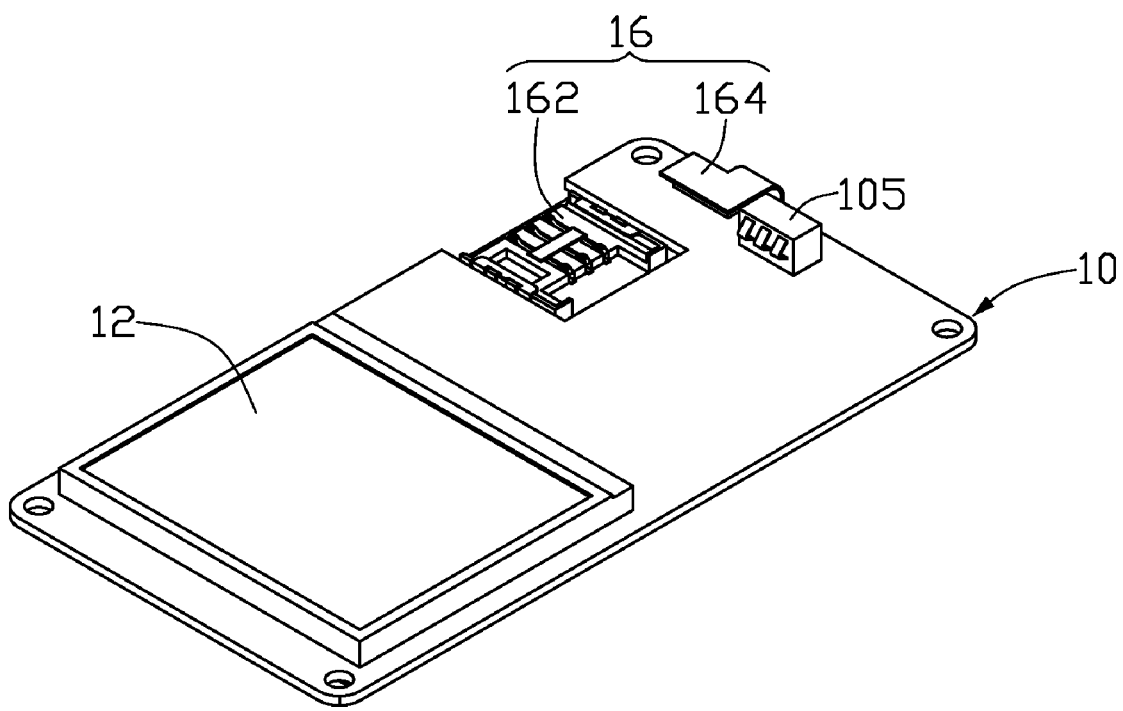
Figure 6:
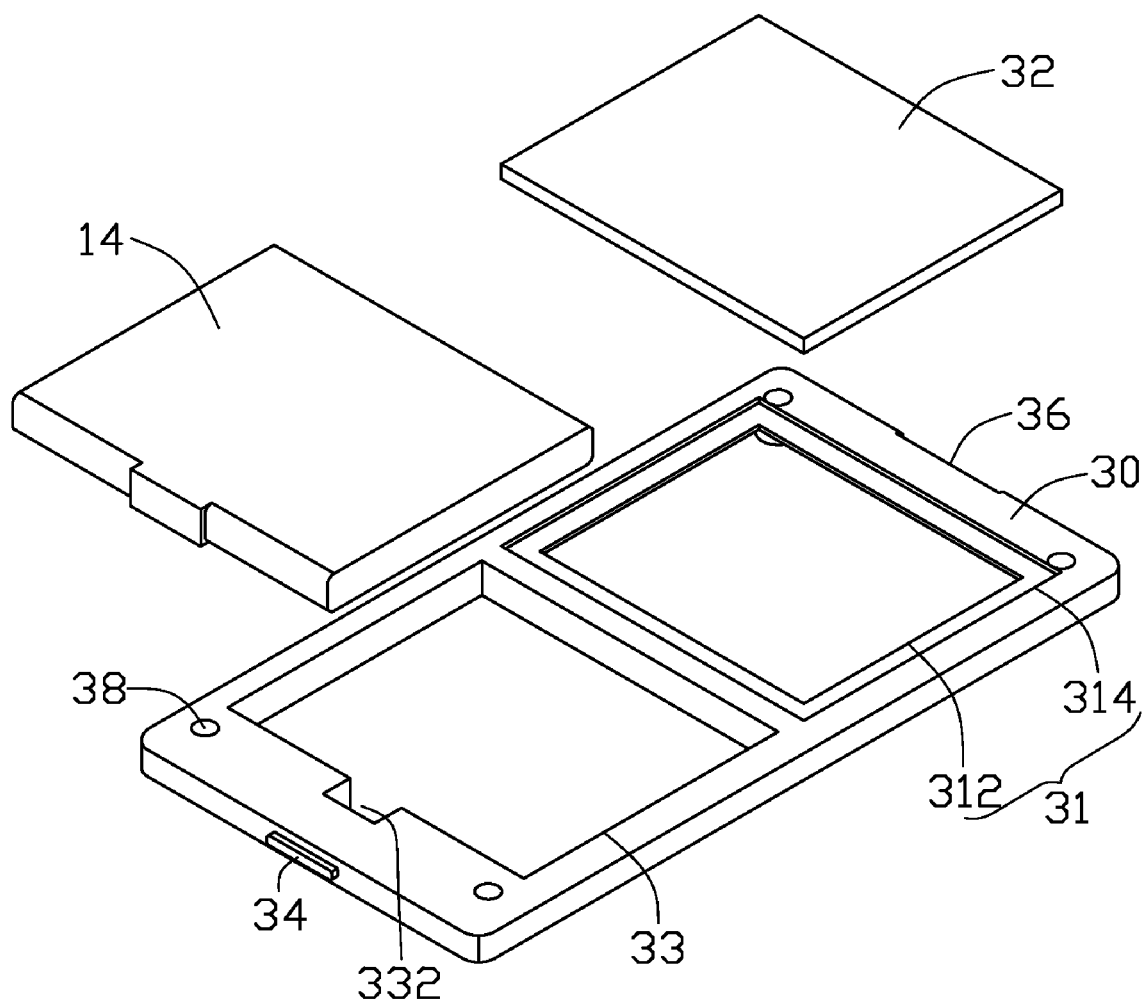
Figure 7:
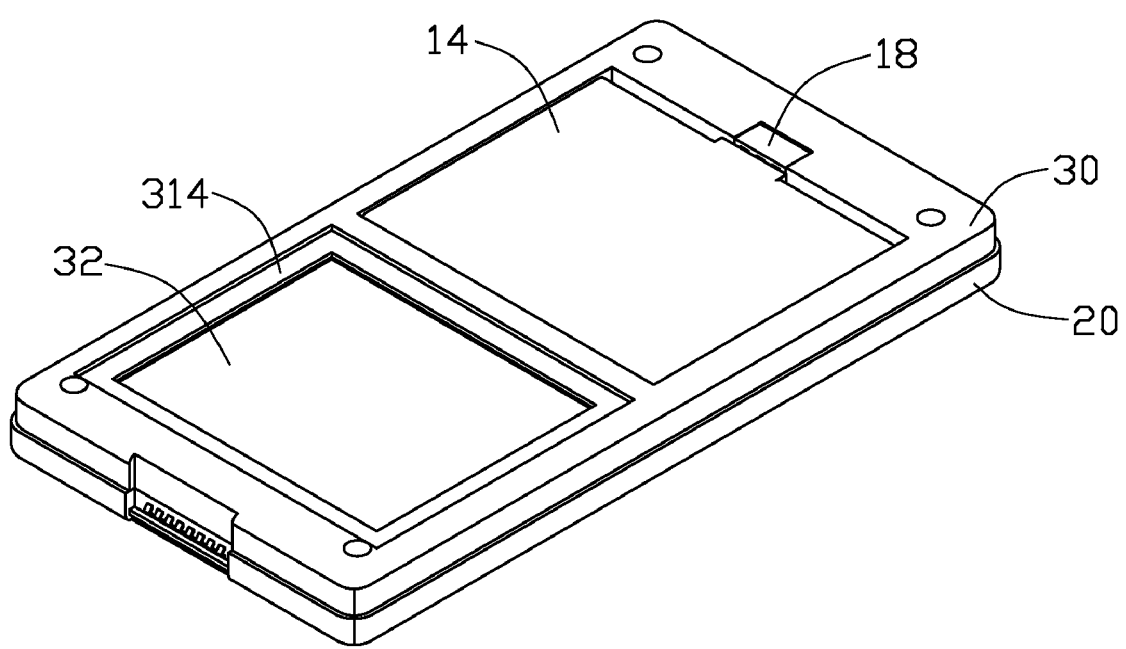

Also referring to FIGS. 6-7, the frame 30 defines a display receiving portion 31 configured for receiving the display 12 and a battery cavity 33 configured for receiving the battery 14. The frame 30 forms a recess 314 at one end thereof and has a bottom wall defining an opening 312 communicating with the recess 314. The size of the recess 314 is larger than that of the opening 312. The protecting film 32 is configured for being receivable in the recess 314 in order to cover the display 12. The frame 30 has one end defining a contact cavity 332 therethrough and having a fixing projection 34 formed thereon, and an opposite end defining a receiving groove 36 therein. The contact cavity 332 communicates with the battery cavity 33. The charging contact unit 105 of the circuit board 10 and the charging end 142 of the battery 14 are configured for being receivable in the contact cavity 332. The receiving groove 36 corresponds to the groove 232 of the lower housing 20. The frame 30 defines four mounting holes 38 respectively in four corners thereof. Each mounting hole 38 corresponds to a mounting hole 106 of the circuit board 10 and a mounting hole 26 of the lower housing 20. The protecting film 32 is transparent enabling light to travel therethrough and is made of glass or plastic.

Figure 8:
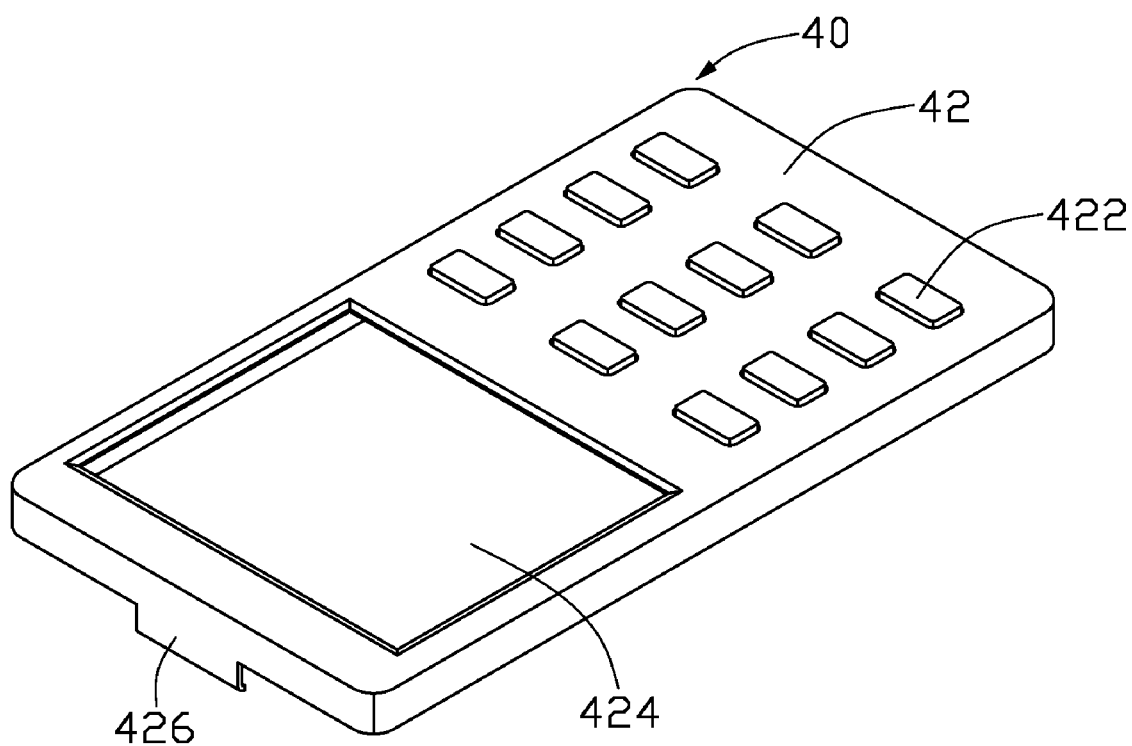
Figure 9:
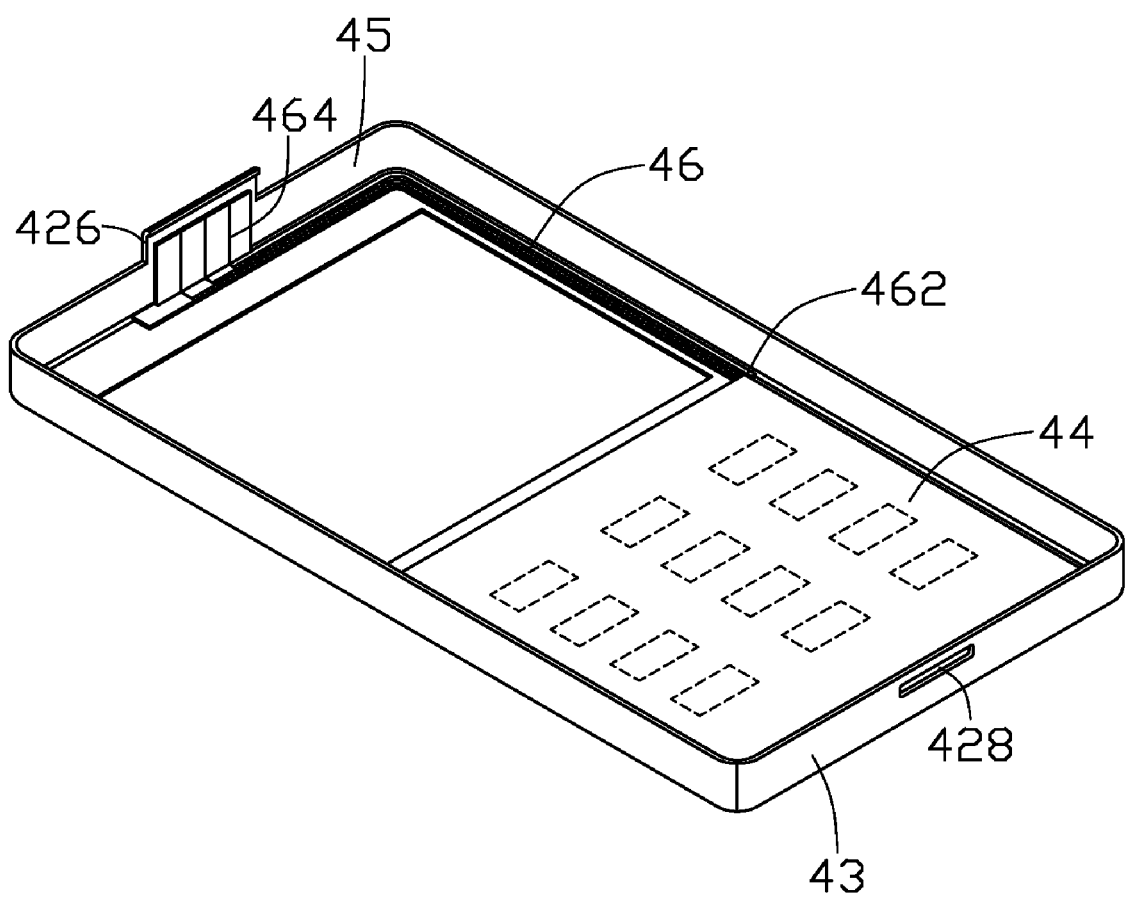

Also referring to FIGS. 8-9, the upper housing 40 has a main body (not labeled) with an outer surface 42 and an inner surface 44 at an opposite side of the outer surface 42. The outer surface 42 has one end forming with a plurality of keys 422 and an opposite end defining a display section 424 therethrough. The display section 424 is configured for revealing the display 12 when the upper housing 40 is assembled with the circuit board 10. A first breadthwise wall 43 and a second breadthwise wall 45 extend from two opposite short edges of the inner surface 44. The first breadthwise wall 43 defines a fixing slot 428 in a center thereof. The fixing slot 428 is configured for receiving the fixing projection 34 of the frame 30 in order to fix the frame 30 to the upper housing 40. A clasp 426 is formed at a center of the second breadthwise wall 45 and is configured for engaging with the receiving groove 36 of the frame 30, the groove 232 of the lower housing 20, and the protrusion 234 of the lower housing 20, in order to fix the upper housing 40, the frame 30, and the lower housing 20 together.

A flexible printed circuit (FPC) 46 is provided on the inner surface 44. The flexible printed circuit 46 has first and second ends 462, 464 configured for electrically connecting with a keypad circuit provided on the circuit board 10. The second end 464 is provided on the clasp 426 in order to electrically connect to the outer end 244 of the connector 24 of the lower housing 20.

Figure 10:
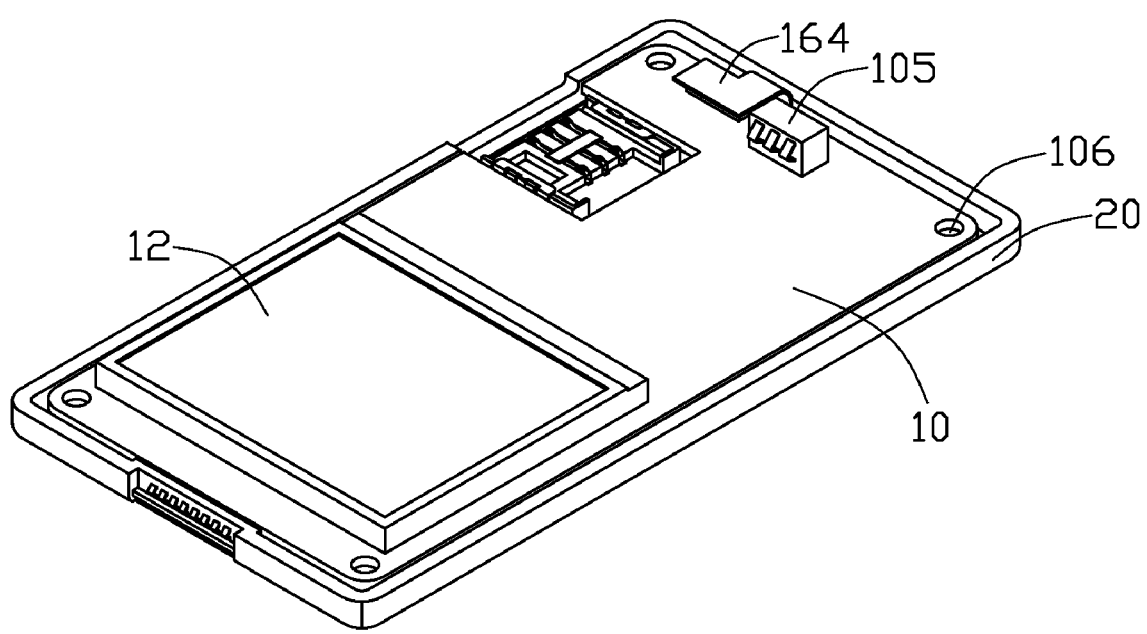

Also referring to FIG. 10, in assembly, the electronic portion 162 of card connector 16 is inserted into the cutout 104 of the circuit board 10. The latching portion 164 of the card connector 16 is attached to one end of the circuit board 10. The circuit board 10 is mounted to the inner surface 21 of the lower housing 20. The battery 14 is inserted into the battery cavity 33 of the frame 30. The frame 30 is mounted to the top surface 101 of the circuit board 10. The display 12 is inserted into the opening 312 of the frame. The charging end 142 of the battery 14 and the charging contact unit 105 are received in the contact cavity 332 of the frame 30. A bolt is being inserted into each group of corresponding mounting holes 38, 106, 26 thereby fixing the frame 30, the circuit board 10, and the lower housing 20 together. The protecting film 32 is fixed in the recess 314 of the frame 30.

Figure 11:
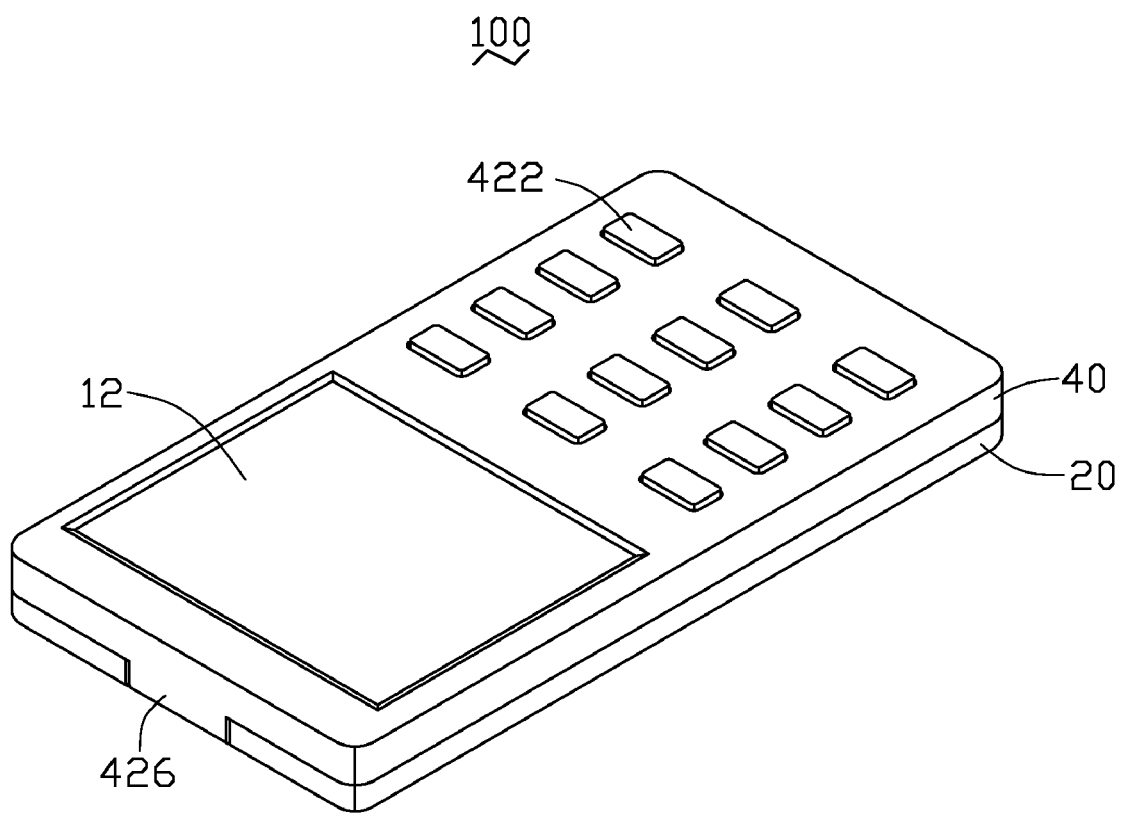

The upper housing 40 is mounted to the assembled frame 30, circuit board 10, and lower housing 20. The fixing projection 34 of the frame 30 is received in the fixing slot 428 of the upper housing 40. The clasp 426 of the upper housing 40 is engaged with the protrusion 234 of the lower housing 20. The display 12 is seen through the display section 424 of the upper housing. Thus, the portable electronic device 100 is completely assembled, as represented in FIG. 11.

It should be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A portable electronic device comprising:
   an upper housing defining a display section therein and having a clasp formed in a wall thereof;
   a circuit board having a top surface and an opposite bottom surface;
   a display being seen outwardly through the display section;
   a battery, the battery and the display being located adjacent to each other on the top surface of the circuit board;
   a flexible printed circuit having at least one end fixed to the clasp; and
   a lower housing defining a groove in a wall thereof, and having a connector received in the groove and a protrusion formed on the bottom surface of the groove, the end of the flexible printed circuit on the clasp electronically connecting with the connector, and the clasp engaging with the protrusion;
   wherein the circuit board, the battery and the display are placed in-between the lower housing and the upper housing, and the upper housing is detachably mounted to the lower housing for detachably holding the battery.

2. The portable electronic device as claimed in claim 1, further comprising a frame placed in-between the lower housing and the upper housing, wherein the frame defines a display receiving portion and a battery cavity adjacent to each other, the display receiving portion receiving the display therein, and the battery cavity receiving the battery therein.

3. The portable electronic device as claimed in claim 2, wherein the battery has a charging end formed at one side thereof, the frame defining a contact cavity communicating with the battery cavity, and the charging end is received in the contact cavity.

4. The portable electronic device as claimed in claim 3, wherein the circuit board forms a charging contact unit on the top surface thereof, the charging contact units is received in the contact cavity of the frame.

5. The portable electronic device as claimed in claim 1, further comprising a card connector, the circuit board defining a cutout for partially receiving the card connector therein.

6. The portable electronic device as claimed in claim 5, wherein the card connector has an electronic portion received in the cutout and a substantially U-shaped latching portion attached to one end of the circuit board.

7. An electronic module for portable electronic device, comprising:
   a circuit board having a top surface and a bottom surface at an opposite side of the top surface;
   a display;

a battery, the battery and the display being formed adjacent to each other on the top surface of the circuit board, the battery having a charging end formed at one side thereof; and a frame defining a display receiving portion, a battery cavity adjacent to the display receiving portion and a contact cavity communicating with the battery cavity, the display receiving portion receiving the display therein the battery cavity receiving the battery therein, and the contact cavity receiving the charging end therein, wherein the circuit board has a charging contact unit on the top surface thereof, and the charging contact unit is received in the contact cavity of the frame.

8. The electronic module as claimed in claim 7, further comprising a card connector, the circuit board defining a cutout therein, configured for partially receiving the card connector therein.

9. The electronic module as claimed in claim 8, wherein the card connector has an electronic portion received in the cutout and a substantially U-shaped latching portion attached to one end of the circuit board.

10. An electronic module for portable electronic device, comprising:
a circuit board having a top surface and a bottom surface, the circuit board defining a cutout therein;
a display;
a battery, the battery and the display being formed adjacent to each other on the top surface of the circuit board; and
a card connector having an electronic portion received in the cutout of the circuit board and a substantially U-shaped latching portion attached to one end of the circuit board, the electronic module further comprising:
a frame defining a display receiving portion and a battery cavity adjacent to each other, the display receiving portion receiving the display therein, and the battery cavity receiving the battery therein, wherein the battery has a charging end formed at one side thereof, the frame defining a contact cavity communicating with the battery cavity, the circuit board forms a charging contact unit on the top surface thereof, the charging contact unit is received in the contact cavity of the frame and electrically connects to the charging end.

* * * * *